H. M. R. GLOVER.
ADAPTER FOR FILM PACKS.
APPLICATION FILED MAR. 29, 1909.
987,620.
Patented Mar. 21, 1911.
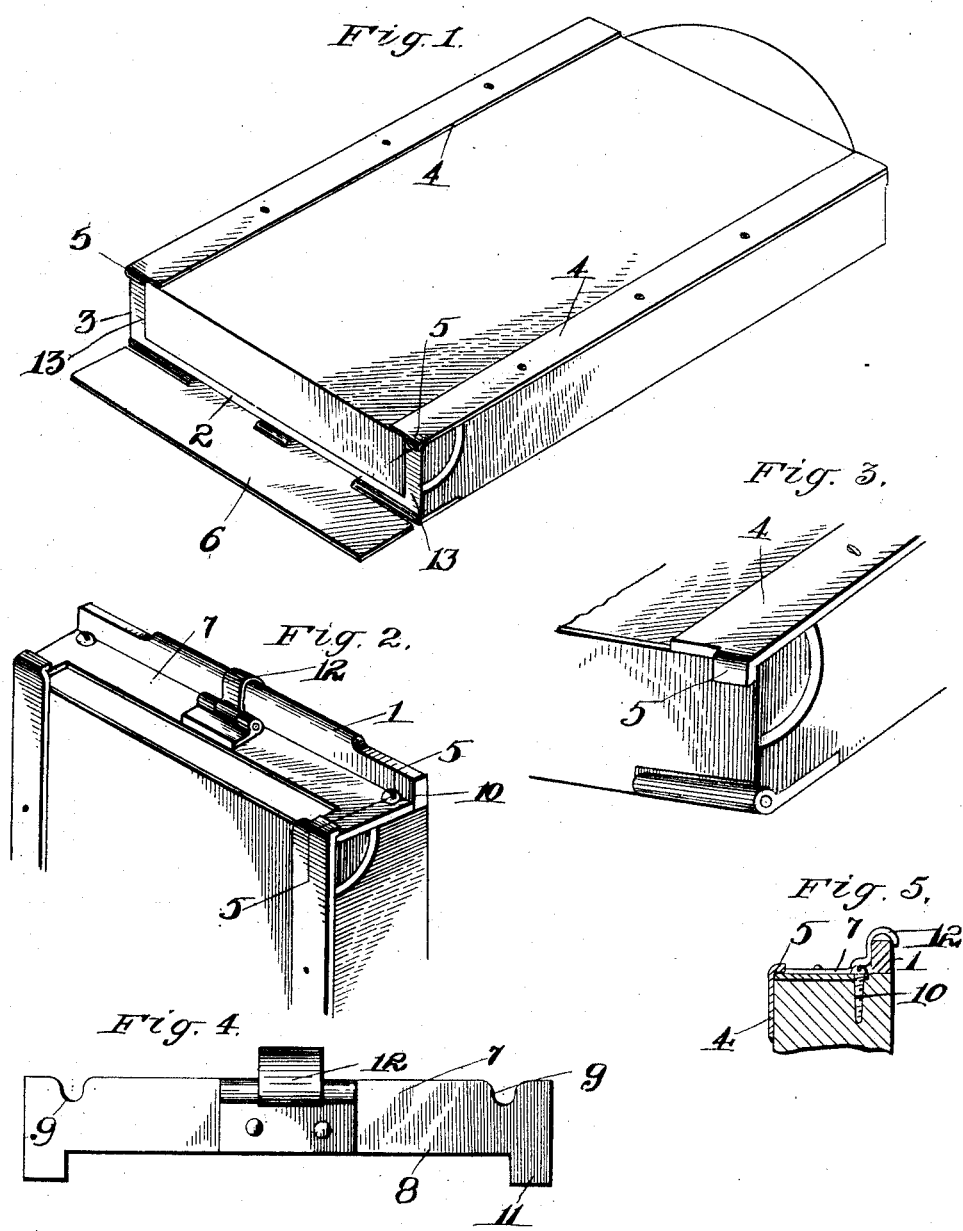
Witnesses
Jas. E. Dodge
J. Austa
Inventor
Harry M. R. Glover
by Wilkinson, Fisher & Witherspoon
his Attorneys

UNITED STATES PATENT OFFICE.

HARRY M. R. GLOVER, OF ROCHESTER, NEW YORK.

ADAPTER FOR FILM-PACKS.

987,620.  Specification of Letters Patent.  Patented Mar. 21, 1911.

Application filed March 29, 1909. Serial No. 486,508.

*To all whom it may concern:*

Be it known that I, HARRY M. R. GLOVER, a citizen of Canada, having filed first papers and having declared my intention of becoming a citizen of the United States, residing at Rochester, in the county of Monroe and State of New York, have invented certain new and useful Improvements in Adapters for Film-Packs; and I do hereby declare the following to be a full, clear, and exact description of the invention, such as will enable others skilled in the art to which it appertains to make and use the same.

This invention relates to improvements in adapters for use with photographic films, particularly when they are arranged in packages for daylight loading, and the invention has for its object to provide a cheap but effective means for carrying out the desired end. Applicant does not claim broadly the general idea of an adapter for this use, as these are now becoming well known in the art of photography, but one of the primary features of the present invention is the detailed arrangement whereby the film pack may be inserted from one or either end of the adapter by its being slid edgewise therein instead of being inserted from the back. This construction affords a better arrangement for the exclusion of light which otherwise might seep around from the rear of the film pack between the side edges of the pack and the adapter, and in front of the pack where the film is exposed. By the present structure, however, the arrangement is such that this leakage of light is prevented by means of protecting strips which also hold the film pack in position.

Other advantageous features will appear from the following description, and the particular points of novelty will be pointed out more succinctly in the claims.

While applicant does not claim the broad idea of an adapter, still the invention is not restricted to the exact details shown and described with relation to affixing the end plates in position, but for the purpose of disclosure reference is had to the accompanying drawings illustrating a practical embodiment of the invention, in which drawings like letters designate the same parts in the several views, and in which—

Figure 1 is a perspective view looking at the rear of the adapter with a package of films inserted in place, and showing the hinged bottom plate open. Fig. 2 is a fragmentary perspective view looking down upon the top plate of the adapter. Fig. 3 is a fragmentary enlarged perspective view looking toward the bottom of the adapter and showing the bottom plate latched in its closed position. Fig. 4 is a plan view in detail, showing the top plate detached, and Fig. 5 is a fragmentary view in longitudinal section on the line 5—5 of Fig. 2.

The general structure of the adapter is as in the ordinary plate holder, comprising a frame having an exposure opening closed by the usual opaque slide 1, but in the present structure instead of having fixed top and bottom plates, the framework simply consists of a rectangular frame 2 having side walls 3, and having its rear and its top and bottom faces open. On the rear edges of the side walls 3, however, are arranged a pair of strips 4. In the form of construction shown, these strips are resilient and are secured to the rear edge of the sides 3, being provided with an overhanging lip at one or both ends, as at 5, forming catches or latching means hereinafter referred to.

The bottom plate 6 of the adapter is shown as hinged at the lower edge of the framework, and when in its closed position is held latched by the projecting lips 5. It will be understood that these projecting lips 5 are no wider than the thickness of the side walls 3, so that the plates 4 will be allowed to extend laterally beyond the inner edge of the side walls without in any way interfering with the insertion of the film pack.

The top plate 7 is shown as being entirely detachable and consists of the elongated body portion cut away as at 8 to form a recess for the reception of the pulling tabs of the film pack and provided on its forward edge with the recesses 9, adapted to straddle the headed screws 10, secured in the top edges of the side walls, but left projecting above the side walls a sufficient distance to enable the plate 7 to pass beneath same. The rear projecting portions 11 of the plate 7 are adapted to be engaged by the lips 5 at the upper end of the resilient plates 4.

Any suitable means may be provided for holding the opaque slide securely in its closed position, and in the drawings I have shown a pivoted hook 12, mounted centrally on the top plate 7.

From the foregoing it will be observed that the film pack may be inserted from the bottom of the adapter by unlatching the bottom plate 6, and it will also be observed that the film pack may be inserted from the top of the adapter by removing the detachable plate 7, and in either case the spaces (indicated at 13 in Fig. 1) between the edges of the film pack and the side walls 3 will be protected against the leakage of light therearound by means of the inwardly projecting plates 4.

Having thus described the invention, what I claim is:

1. A film pack adapter comprising a frame having an exposure opening, a closure therefor, and an open compartment for the reception of a film pack, said compartment being formed by side walls and end walls, one of said end walls being movable to allow of the endwise insertion of a film pack; and light protecting strips disposed along the rear edges of said side walls and projecting inwardly above said compartment, substantially as described.

2. A film pack adapter comprising a frame having an exposure opening, a closure therefor, and an open compartment for the reception of a film pack, said compartment being formed by side walls and end walls, one of said end walls being movable to allow of the endwise insertion of a film pack; and light protecting strips disposed along the rear edges of said side walls and projecting inwardly above said compartment, one of said strips being provided with an overhanging lip forming a latch for said movable end plate, substantially as described.

3. A film pack adapter comprising a frame having an exposure opening, a closure therefor, and an open compartment for the reception of a film pack, said compartment being formed by side walls and end walls, one of said end walls being detachably connected to said frame to permit of the removal of said plate to provide for the insertion of a film pack; and light protecting strips disposed along the rear edges of said side walls and projecting inwardly above said compartment, substantially as described.

4. A film pack adapter comprising a frame having an exposure opening, a closure therefor, rearwardly projecting side and end walls on said frame forming an open compartment, one of said end walls consisting of a detachable plate provided with recesses on its forward edge, light protecting strips disposed along the rear edges of said side walls and projecting inwardly above said compartment, each of said strips being provided with an overhanging lip forming a latch for said detachable plate, and headed fastening means disposed in the ends of said side walls and spaced therefrom to coöperate with said recesses and hold the forward edge of said end plate securely in position, substantially as described.

5. A film pack adapter comprising a frame having an exposure opening, a closure therefor, and an open compartment for the reception of the film pack, said compartment being formed by side walls and movable end walls adapted to permit the endwise insertion of a film pack within said compartment, and inwardly projecting protecting strips of resilient material disposed along the rear edges of said side walls and provided at their ends with projecting lips forming latches engaging said movable end walls, substantially as described.

6. A film pack adapter comprising a frame having an exposure opening, a closure therefor, and an open compartment for the reception of a film pack, said compartment being formed by side walls and end walls, resilient metal strips disposed along the rear edges of said side walls and secured thereto centrally, said strips projecting inwardly beyond the inner face of said side walls, and provided at each end with overhanging lips projecting forwardly over the ends of said side walls, said bottom end wall being hinged to said frame and said top end wall being provided with recesses on its forward edge adapted to straddle headed screws in the ends of said side walls and coöperating with said overhanging lips to hold said plate detachably connected to the adapter, said top end plate being also provided with a hinged hook engaging said closure, substantially as described.

7. A holder to contain a package of films, said holder being open ended and of a size and shape to admit of the insertion of a package of films edgewise at either end and to permit the film adjusting tabs to project beyond said holder at one end, and means on the holder to coöperate with a package of films while within the holder to prevent the displacement of the package during the manipulation of the tabs of said films, substantially as described.

8. A film pack adapter comprising a frame having an exposure opening, a closure therefor, and an open compartment for the reception of a film pack with its operating tabs, said compartment being formed by side walls and end walls, and one of said end walls being movable to permit of the edgewise insertion of a film pack and being so constructed as to prevent the displacement of the film pack while adapted to permit the tabs to project beyond said open compartment, substantially as described.

In testimony whereof, I affix my signature, in presence of two witnesses.

HARRY M. R. GLOVER.

Witnesses:
  LULA E. STULL,
  JOHN C. REID.

Copies of this patent may be obtained for five cents each, by addressing the "Commissioner of Patents, Washington, D. C."